US011737393B2

(12) United States Patent
Tang et al.

(10) Patent No.: US 11,737,393 B2
(45) Date of Patent: Aug. 29, 2023

(54) FRUIT PICKING METHOD BASED ON THREE-DIMENSIONAL PARAMETER PREDICTION MODEL FOR FRUIT

(71) Applicant: Guangdong Polytechnic Normal University, Guangzhou (CN)

(72) Inventors: Yu Tang, Guangzhou (CN); Shaoming Luo, Guangzhou (CN); Weizhao Chen, Guangzhou (CN); Jiahao Li, Guangzhou (CN); Jiepeng Yang, Guangzhou (CN); Yiqing Fu, Guangzhou (CN); Jinfei Zhao, Guangzhou (CN); Xiaodi Zhang, Guangzhou (CN); Qiwei Guo, Guangzhou (CN); Xincai Zhuang, Guangzhou (CN); Huasheng Huang, Guangzhou (CN); Chaojun Hou, Guangzhou (CN); Jiajun Zhuang, Guangzhou (CN); Aimin Miao, Guangzhou (CN)

(73) Assignee: GUANGDONG POLYTECHNIC NORMAL UNIVERSITY, Guangzhou (CN)

( * ) Notice: Subject to any disclaimer, the term of this patent is extended or adjusted under 35 U.S.C. 154(b) by 0 days.

(21) Appl. No.: 17/744,053

(22) Filed: May 13, 2022

(65) Prior Publication Data

US 2022/0377980 A1 Dec. 1, 2022

(30) Foreign Application Priority Data

May 25, 2021 (CN) .......................... 202110570385.5

(51) Int. Cl.
*A01D 46/30* (2006.01)
*G06T 7/579* (2017.01)
*A01D 46/26* (2006.01)

(52) U.S. Cl.
CPC .............. *A01D 46/30* (2013.01); *G06T 7/579* (2017.01); *A01D 2046/268* (2013.01)

(58) Field of Classification Search
CPC .. A01D 46/30; A01D 2046/268; A01D 46/26; A01D 46/264; A01D 2046/266; G06T 7/579; G06T 7/55
See application file for complete search history.

(56) References Cited

U.S. PATENT DOCUMENTS 4,519,193 A * 5/1985 Yoshida ................. A01D 46/30
348/89
5,426,927 A * 6/1995 Wang ..................... A01D 46/24
56/328.1
(Continued)

FOREIGN PATENT DOCUMENTS

CN 111328554 A * 6/2020 ............. A01D 46/30
CN 112197705 A * 1/2021
(Continued)

*Primary Examiner* — Adam J Behrens
*Assistant Examiner* — Madeline I Runco
(74) *Attorney, Agent, or Firm* — Getech Law LLC; Jun Ye

(57) ABSTRACT

A fruit picking method based on a three-dimensional parameter prediction model for a fruit comprises: performing first-time image acquisition processing on a to-be-picked fruit to obtain a first image; determining a first range; controlling a manipulator to perform first-time moving processing; performing intermittent gas injection treatment to lead to forced vibration of the to-be-picked fruit; performing second-time image acquisition processing many times to obtain a plurality of second images; screening out, by taking the first image as an reference object, two appointed second images deviating from an equilibrium position to the maximum extent; jointly inputting the images into a preset three-dimensional parameter prediction model for the fruit so as to obtain predicted three-dimensional parameters;

(Continued)

controlling the manipulator to perform second-time moving processing; and performing cutting processing on a fruit stem position to make the to-be-picked fruit fall onto the manipulator.

5 Claims, 2 Drawing Sheets

(56) References Cited

U.S. PATENT DOCUMENTS

| | | | |
|---|---|---|---|
| 10,617,064 B2* | 4/2020 | Regan | G06T 7/0004 |
| 2010/0292841 A1* | 11/2010 | Wickham | B25J 15/0206 |
| | | | 700/259 |
| 2020/0286282 A1* | 9/2020 | Grant | G06T 17/10 |
| 2021/0243967 A1* | 8/2021 | Bartrom | B25J 9/1697 |
| 2022/0030769 A1* | 2/2022 | Krichevsky | A01D 45/00 |
| 2022/0110263 A1* | 4/2022 | Haldewang | G05D 1/0246 |
| 2022/0124979 A1* | 4/2022 | Fu | G05D 1/0217 |
| 2022/0167558 A1* | 6/2022 | Xu | G06T 7/11 |

FOREIGN PATENT DOCUMENTS

| | | | | |
|---|---|---|---|---|
| CN | 112772144 A * | 5/2021 | | |
| CN | 113099845 A * | 7/2021 | | |
| ES | 2296452 A1 * | 4/2008 | | A01D 46/30 |
| KR | 20200133873 A * | 12/2020 | | |
| WO | WO-2017049304 A1 * | 3/2017 | | A01D 46/005 |
| WO | WO-2018033926 A1 * | 2/2018 | | A01D 46/253 |
| WO | WO-2018090914 A1 * | 5/2018 | | G06T 11/80 |
| WO | WO-2020075480 A1 * | 4/2020 | | A01D 46/30 |

\* cited by examiner

FRUIT PICKING METHOD BASED ON THREE-DIMENSIONAL PARAMETER PREDICTION MODEL FOR FRUIT

TECHNICAL FIELD

The application relates to the field of computers, in particular to a fruit picking method and device based on a three-dimensional parameter prediction model for a fruit, a computer device and a storage medium.

BACKGROUND

Intelligent picking technologies are crucial to fruit picking in automated agriculture. In order to save increasingly high labor cost, there have been some automated picking technologies at present. For example, an unfolded plastic film is used as a fruit catcher and a vibration generator is further used to vibrate a fruit tree trunk, so that fruits fall into the plastic film. However, these existing automated picking technologies are insufficient in degree of intelligence, cannot avoid the problem that the fruits are damaged, and are even likely to damage the fruit trees themselves. Therefore, it is lack of solutions to pick fruits precisely and intelligently without damaging the fruits and the fruit trees at present.

SUMMARY

The application provides a fruit picking method based on a three-dimensional parameter prediction model for a fruit, including the following steps:

S1. performing first-time image acquisition processing on a to-be-picked fruit by using a pre-arranged camera to obtain a first image;

S2. determining a first range that accommodates the to-be-picked fruit based on the first image according to a preset range positioning method;

S3. controlling a pre-arranged manipulator to perform first-time moving processing to move the manipulator to an outside of the first range and cover the first range from below, and guaranteeing that the manipulator does not enter the first range in a moving process as well;

S4. controlling a pre-arranged gas injection device to perform intermittent gas injection treatment in the first range to lead to forced vibration of the to-be-picked fruit in the first range;

S5. performing second-time image acquisition processing on the to-be-picked fruit many times by using a pre-arranged camera in a forced vibration process of the to-be-picked fruit to obtain a plurality of second images;

S6. performing, by taking the first image as a reference object, screening processing on the plurality of second images according to a preset image screening method to screen out two appointed second images deviating from an equilibrium position to the maximum extent;

S7. jointly inputting the first image and the two second images into a preset three-dimensional parameter prediction model for the fruit so as to obtain predicted three-dimensional parameters outputted by the three-dimensional parameter prediction model for the fruit, wherein the three-dimensional parameter prediction model for the fruit is trained by a preset neural network model;

S8. determining a second range according to the predicted three-dimensional parameters and controlling the manipulator to perform second-time moving processing to make the manipulator reduce a coverage to the second range, wherein the second range is smaller than the first range; and S9. determining a fruit stem position in the first image and performing cutting processing on the fruit stem position by using a pre-arranged cutting device to make the to-be-picked fruit to fall onto the manipulator, so as to complete a picking process.

Further, the step S2 of determining a first range that accommodates the to-be-picked fruit based on the first image according to a preset range positioning method includes:

S201. acquiring a maximum accommodation range of the manipulator that unfolds mechanical fingers to the maximum extent;

S202. determining a center position of the to-be-picked fruit in the first image and drawing the maximum accommodation range based on the center position to obtain a temporary range;

S203. judging whether the temporary range accommodates the to-be-picked fruit fully or not; and S204. marking the temporary range as the first range if the temporary range accommodates the to-be-picked fruit fully.

Further, the step S4 of controlling a pre-arranged gas injection device to perform intermittent gas injection treatment in the first range to lead to forced vibration of the to-be-picked fruit in the first range includes:

S401. controlling the pre-arranged gas injection device to perform intermittent gas injection treatment in the first range along a first direction to lead to forced vibration of the to-be-picked fruit located in the first range in the first direction, wherein an angle between the first direction and an image acquisition direction of the camera is not zero;

and the step S5 of performing second-time image acquisition processing on the to-be-picked fruit many times by using a pre-arranged camera in a forced vibration process of the to-be-picked fruit to obtain a plurality of second images comprises:

S501. projecting, by a pre-arranged spot generator, an appointed spot on the to-be-picked fruit in the forced vibration process of the to-be-picked fruit, wherein a projection direction of the appointed spot projected by the spot generator is parallel to the image acquisition direction of the camera; and S502. performing second-time image acquisition processing on the to-be-picked fruit projected by the appointed spot many times by using the pre-arranged camera to obtain a plurality of second images with spots.

Further, the step S6 of performing, by taking the first image as a reference object, screening processing on the plurality of second images according to a preset image screening method to screen out two appointed second images deviating from an equilibrium position to the maximum extent includes:

S601. extracting feature points from the first image and acquiring positions of the feature points in the plurality of second images with the spots;

S602. performing vector generation processing by taking the feature point as a starting point and the appointed spot as an ending point so as to obtain a plurality of deviation measuring vectors respectively corresponding to the plurality of second images with the spots; and S603. screening out the two appointed second images deviating from the equilibrium position to the maximum extent based on the plurality of deviation measuring vectors.

Further, before the step S7 of jointly inputting the first image and the two second images into a preset three-dimensional parameter prediction model for the fruit so as to obtain predicted three-dimensional parameters outputted by the three-dimensional parameter prediction model for the fruit, the three-dimensional parameter prediction model for the fruit being trained by a preset neural network model, the method includes:

S61. performing image acquisition processing on a sample fruit growing on a tree to obtain a first sample image;

S62. performing intermittent gas injection treatment on the sample fruit by using the pre-arranged gas injection device to lead to forced vibration of the sample fruit;

S63. respectively performing image acquisition processing when the sample fruit is located in two maximum amplitude positions to obtain two second sample images;

S64. performing manual measurement on the sample fruit to obtain the three-dimensional parameters of the sample fruit;

S65. taking the first sample image and the two second sample images as a sample image set, and annotating the three-dimensional parameters of the sample fruit on the sample image set;

S66. dividing the sample image set into a training image set and a verifying image set, invoking the preset neural network model, and inputting the training image set into the neural network model to be trained to obtain an intermediate prediction model;

S67. performing verification processing on the intermediate prediction model by using the verifying image set, and judging whether a verification processing result is that the intermediate prediction model passes the verification or not; and S68. marking the intermediate prediction model as the three-dimensional parameter prediction model for the fruit if the verification processing result is that the intermediate predication model passes the verification.

The application provides a fruit picking device based on a three-dimensional parameter prediction model a fruit, including:

a first image acquisition unit for performing first-time image acquisition processing on a to-be-picked fruit by using a pre-arranged camera to obtain a first image;

a first range determination unit for determining a first range that accommodates the to-be-picked fruit based on the first image according to a preset range positioning method;

a first-time moving unit for controlling a pre-arranged manipulator to perform first-time moving processing to move the manipulator to an outside of the first range and cover the first range from below, and guaranteeing that the manipulator does not enter the first range in a moving process as well;

a gas injection unit for controlling a pre-arranged gas injection device to perform intermittent gas injection treatment in the first range to lead to forced vibration of the to-be-picked fruit in the first range;

a second image acquisition unit for performing second-time image acquisition processing on the to-be-picked fruit many times by using a pre-arranged camera in a forced vibration process of the to-be-picked fruit to obtain a plurality of second images;

a second image screening unit for performing, by taking the first image as a reference object, screening processing on the plurality of second images according to a preset image screening method to screen out two appointed second images deviating from an equilibrium position to the maximum extent;

a predicted three-dimensional parameter acquisition unit for jointly inputting the first image and the two second images into a preset three-dimensional parameter prediction model for the fruit so as to obtain predicted three-dimensional parameters outputted by the three-dimensional parameter prediction model for the fruit, wherein the three-dimensional parameter prediction model for the fruit is trained by a preset neural network model;

a second-time moving unit for determining a second range according to the predicted three-dimensional parameters and controlling the manipulator to perform second-time moving processing to make the manipulator reduce a coverage to the second range, wherein the second range is smaller than the first range; and a fruit picking unit for determining a fruit stem position in the first image and performing cutting processing on the fruit stem position by using a pre-arranged cutting device to make the to-be-picked fruit to fall onto the manipulator, so as to complete a picking process.

The application provides a computer device, including a memory and a processor, the memory storing a computer program, wherein the processor realizes the steps of any one method when executing the computer program.

The application provides a computer readable storage medium, having computer readable instructions stored therein, wherein the steps of any one method is realized when the instructions are executed by the processor.

The application discloses a fruit picking method and device based on a three-dimensional parameter prediction model for a fruit, a computer device and a storage medium. The method includes: performing first-time image acquisition processing on a to-be-picked fruit to obtain a first image; determining a first range that accommodates the to-be-picked fruit; controlling a pre-arranged manipulator to perform first-time moving processing; performing intermittent gas injection treatment in the first range to lead to forced vibration of the to-be-picked fruit in the first range; performing second-time image acquisition processing many times to obtain a plurality of second images; performing screening, by taking the first image as an reference object, the plurality of second images, to screen out two appointed second images deviating from an equilibrium position to the maximum extent; jointly inputting the first image and the two appointed second images into a preset three-dimensional parameter prediction model for the fruit so as to obtain predicted three-dimensional parameters outputted by the three-dimensional parameter prediction model for the fruit; determining a second range according to the predicted three-dimensional parameter, and controlling the manipulator to perform second-time moving processing; and performing cutting treatment on a fruit stem position by using a pre-arranged cutting device to make the to-be-picked fruit fall onto the manipulator. Therefore, the picking process is completed, and the method realizes a purpose of precisely and intelligently picking the fruit without damaging the fruit and a fruit tree.

The application has the advantages that the fruit three-dimensional parameters can be obtained by using the images in a single direction, thereby realizing accurate positioning and picking of the fruits; according to the solution of the application, only one camera is needed, and it is unnecessary to arranged cameras in a plurality of orientations to determine the three-dimensional spatial positions of the fruits (conventional three-dimensional positioning technologies necessarily depending on a plurality of images acquired by the cameras in a plurality of orientations can realize spatial positioning), so that the cost is lowered, the implementing convenience is improved, and the overall picking efficiency is improved.

Further description will be further made on implementation, functional characteristics and advantages of the object of the application with reference to drawings in combination of embodiments.

DETAILED DESCRIPTION OF EMBODIMENTS

In order to make purposes, technical schemes and advantages of the application clearer, the application is further described in detail below in combination with drawings and embodiments. It is to be understood that the specific examples described herein are merely used for explaining the application, instead of limiting the application.

Figure 1:
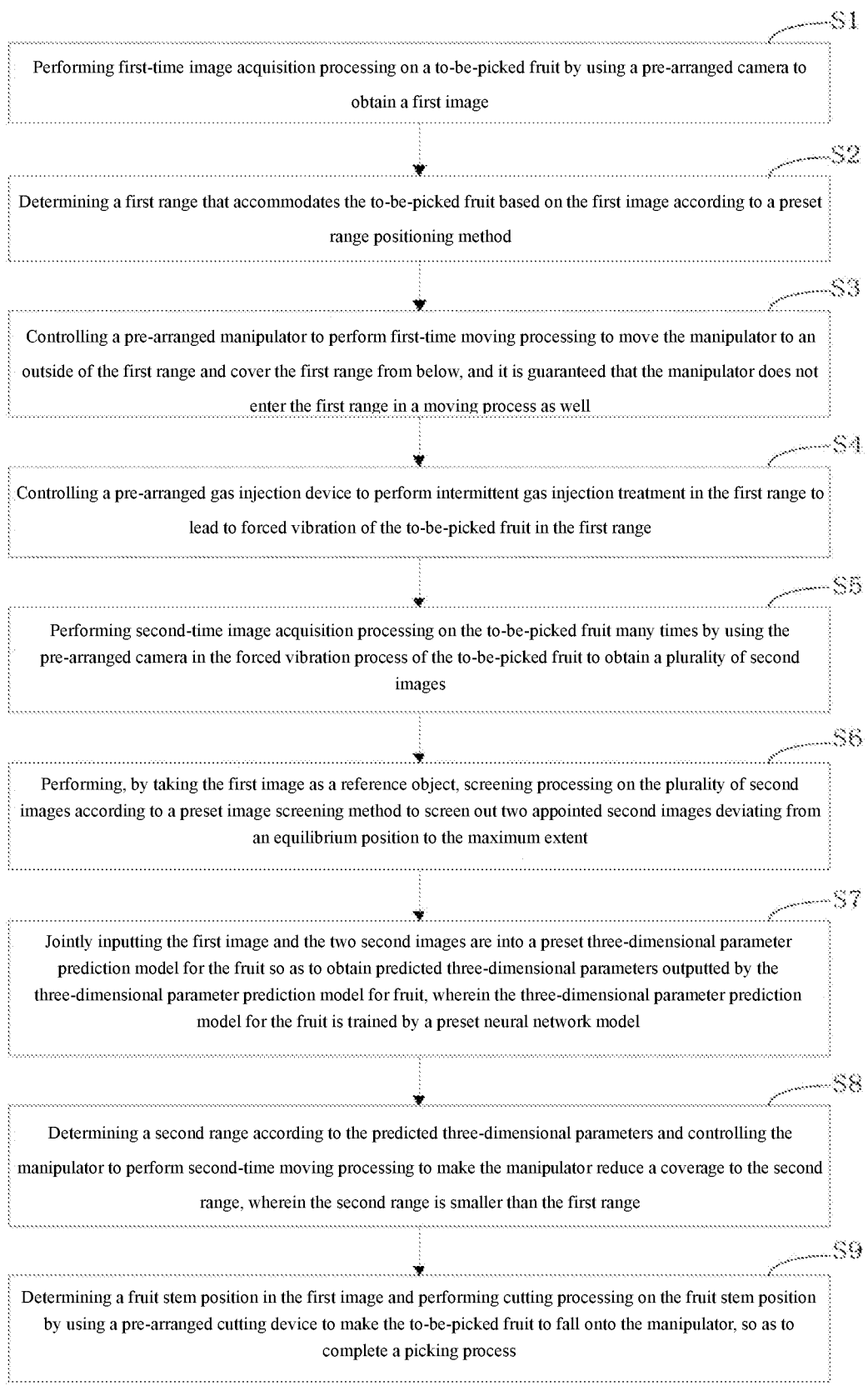
FIG. 1 is a flow schematic diagram of a fruit picking method based on a three-dimensional parameter prediction model for a fruit of an embodiment of the application.

Referring to FIG. 1, the embodiment of the application provides a fruit picking method based on a three-dimensional parameter prediction model for a fruit, including the following steps:

S1. first-time image acquisition processing is performed on a to-be-picked fruit by using a pre-arranged camera to obtain a first image;

S2. a first range that accommodates the to-be-picked fruit is determined based on the first image according to a preset range positioning method;

S3. a pre-arranged manipulator is controlled to perform first-time moving processing to move the manipulator to an outside of the first range and cover the first range from below, and it is guaranteed that the manipulator does not enter the first range in a moving process as well;

S4. a pre-arranged gas injection device is controlled to perform intermittent gas injection treatment in the first range to lead to forced vibration of the to-be-picked fruit in the first range;

S5. second-time image acquisition processing is performed on the to-be-picked fruit many times by using a pre-arranged camera in a forced vibration process of the to-be-picked fruit to obtain a plurality of second images;

S6. by taking the first image as a reference object, screening processing is performed on the plurality of second images according to a preset image screening method to screen out two appointed second images deviating from an equilibrium position to the maximum extent;

S7. the first image and the two second images are jointly inputted into a preset three-dimensional parameter prediction model for the fruit so as to obtain predicted three-dimensional parameters outputted by the three-dimensional parameter prediction model for the fruit, wherein the three-dimensional parameter prediction model for the fruit is trained by a preset neural network model;

S8. a second range is determined according to the predicted three-dimensional parameters and the manipulator is controlled to perform second-time moving processing to make the manipulator reduce a coverage to the second range, wherein the second range is smaller than the first range; and S9. a fruit stem position in the first image is determined and cutting processing is performed on the fruit stem position by using a pre-arranged cutting device to make the to-be-picked fruit to fall onto the manipulator, so as to complete a picking process.

The application can realize three-dimensional positioning of the fruit with the images (including the first image and the second image) in the single direction, mainly depending on a principle that the applicant finds that besides the applied external force, forced vibration of the fruit is further directly relevant to three-dimensional characteristics of the fruit. The three-dimensional characteristics of the fruit refer to three-dimensional size, shape of the fruit and the like. When the type of the fruit is determined, the shape thereof is also determined (the fruit is usually round or approximately round). Therefore, under a circumstance of the same external force, forced vibration (amplitude, frequency and the like) of the fruit is directly relevant to the three-dimensional size of the fruit. By means of the principle, the method directly acquires the image by utilizing the camera to obtain the first image, so that parameters in two dimensions can be acquired directly. Parameters of remaining dimension can be predicted and obtained through the three-dimensional parameter prediction model for the fruit trained by way of supervised learning according to the principle, so that purposes of three-dimensional precise positioning and fruit picking without a plurality of cameras can be realized.

As described in the above-mentioned steps S1-S3, first-time image acquisition processing is performed on the to-be-picked fruit by using the pre-arranged camera to obtain the first image; the first range that accommodates the to-be-picked fruit is determined based on the first image according to a preset range positioning method; and the pre-arranged manipulator is controlled to perform first-time moving processing to move the manipulator to the outside of the first range and cover the first range from below, and it is guaranteed that the manipulator does not enter the first range in a moving process as well.

There is only one pre-arranged camera, and it is only needed to perform image acquisition processing in one direction. Therefore, the acquired images, either the first image or the second image, are acquired at a fixed position in a fixed direction. The image acquisition mode has the advantages of high speed and low cost without considering an angle fit problem among the plurality of cameras, but bringing a problem: conventional three-dimensional positioning technologies cannot obtain the three-dimensional spatial shape of a shot object merely by virtue of a planar image in one direction. By additionally introducing a vibration factor, the application realizes a purpose of determining the three-dimensional spatial shape of the fruit by utilizing the planar image in the single direction.

The first range that accommodates the to-be-picked fruit is further determined based on the first image according to the preset range positioning method. The first range is a large range with the purpose of improving the error-tolerant rate. As the three-dimensional shape of the fruit cannot be obtained directly based on the first image but related data in two dimensions of the fruit in a plane can be obtained, the fruit grows usually in a symmetrical or approximately symmetrical manner, so that the size of the fruit in the other spatial dimension is further approximate to sizes in the two dimensions. On this basis, a probable three-dimensional size of the fruit is scaled up at a certain proportion so as to determine the first range fuzzily. As long as the fruit is scaled up more, can it be guaranteed that the fruit will not exceed the first range of the to-be-picked fruit even if it grows irregularly.

It is needed to mention two points here: first of all, why doesn't the application directly predict related data in the other spatial dimension based on related data in two dimensions in the plane? This is because symmetrical growth of the fruit is in an ideal condition. Although prediction to a certain extent can be performed by utilizing the related data of the fruit in two dimensions in the plane, the prediction is fuzzy prediction which is low in accuracy. Therefore, this mode is not adopted by the application directly. Second, in the application, why doesn't the manipulator directly perform fruit picking treatment after being directly moved to the first range? This is because the first range is large. The application is intended to realize intelligent fruit picking without damage or with low damage. Although it has been improved to a certain extent compared with the prior art as the first range is directly used as the fruit carrying range, there is still a large distance between the first range and the surface of the fruit. If the fruit is picked directly at the time, the fruit will be damaged to a certain extent in the falling process, so that in the application, the fruit is not picked by directly utilizing the mode.

A pre-arranged manipulator is then controlled to perform first-time moving processing to move the manipulator to an outside of the first range and cover the first range from below, and it is guaranteed that the manipulator does not enter the first range in a moving process as well. In order to prevent the manipulator from colliding with the fruit in the moving process, the manipulator does not enter the first range in the moving process. Furthermore, the manipulator moves to the outside of the first range and covers the first range from below without defining whether there are other objects between the manipulator and the fruit, for example, whether there are branches and the like. That is, even if there are other objects between the manipulator and the fruit, implementation of the application in subsequent steps will not be affected.

Further, the step S2 of determining a first range that accommodates the to-be-picked fruit based on the first image according to a preset range positioning method includes:

S201. a maximum accommodation range of the manipulator that unfolds mechanical fingers to the maximum extent is acquired;

S202. a center position of the to-be-picked fruit in the first image is determined and the maximum accommodation range is drawn based on the center position to obtain a temporary range;

S203. whether the temporary range accommodates the to-be-picked fruit fully or not is judged; and S204. the temporary range is marked as the first range if the temporary range accommodates the to-be-picked fruit fully.

The size of the first rang is determined based on the maximum coverage of the manipulator. There are two determination conditions of the first range: it is necessary to accommodate the to-be-picked fruit, and it is necessary to match with the manipulator. The first condition here requires a large enough first range, and the second condition requires that the first range cannot be too large. Therefore, in the application, a proper first range can be determined by acquiring the maximum accommodation range of the manipulator that unfolds the manipulator fingers to the maximum extent and combining the center of the to-be-picked fruit.

As described in the above-mentioned steps S4-S6, the pre-arranged gas injection device is controlled to perform intermittent gas injection treatment in the first range to lead to forced vibration of the to-be-picked fruit in the first range; second-time image acquisition processing is performed on the to-be-picked fruit many times by using the pre-arranged camera in the forced vibration process of the to-be-picked fruit to obtain a plurality of second images; and by taking the first image as the reference object, screening processing is performed on the plurality of second images according to the preset image screening method to screen out two appointed second images deviating from an equilibrium position to the maximum extent.

The gas injection device can perform injection by using any feasible device, for example a gas injection spray head. Furthermore, as the to-be-picked fruit cannot be accurately positioned at the time, gas injection treatment is performed on the first range. Moreover, the gas injection treatment in the application is purposeful, namely, it is necessary to lead to forced vibration of the to-be-picked fruit in the first range, so that it is necessary to perform intermittent gas injection treatment. This is because the to-be-picked fruit will be blown to one side if continuous gas injection treatment is used. The to-be-picked fruit cannot fall into the equilibrium position, and therefore, forced vibration cannot be performed. Besides, the intermittent time of the intermittent gas injection treatment can be any feasible time while the injection frequency of the intermittent gas injection treatment is preferably smaller than or equal to an inherent vibration frequency of the to-be-picked fruit (the frequency of periodic-like pendular movement due to forced vibration). In combination with the above-mentioned description, the application performing the intermittent gas injection treatment only needs to meet one condition, so that the to-be-picked fruit can move smoothly to the greatest extent due to forced vibration. This is an important part through which the application is implemented. The applicant finds that when the to-be-picked fruit is subjected to forced vibration, the vibration parameters (for example, amplitude and vibration frequency) thereof are directly relevant to the to-be-picked fruit itself (weight, shape of the fruit and the like). The application predicts the third dimension parameter of the to-be-picked fruit by making use of it.

Second-time image acquisition processing is performed on the to-be-picked fruit many times by using the pre-arranged camera in the forced vibration process of the to-be-picked fruit to obtain a plurality of second images. At the time, the camera does not move, and its shooting direction is not changed either. Meanwhile, in the process of performing second-time image acquisition processing, continuous shooting processing is preferably performed to beneficially screen out the most proper second image subsequently so as to improve the accuracy of the overall scheme. Parameters of forced vibration can be actually represented in the plurality of second images. For example, the amplitude can be reflected by a difference between the image in the equilibrium position (the first image) and the second image deviating from the equilibrium position to the maximum extent; or the amplitude can be reflected by a difference between the two second images deviating from the equilibrium position to the maximum extent; and the vibration frequency can further be reflected by an image acquisition time difference between the two second images deviating from the equilibrium position to the maximum extent. Thus, by taking the first image as a reference object, screening processing is then performed on the plurality of second images according to a preset image screening method to screen out two appointed second images deviating from an equilibrium position to the maximum extent, Further, the step S4 of controlling a pre-arranged gas injection device to perform intermittent gas injection treatment in the first range to lead to forced vibration of the to-be-picked fruit in the first range includes:

S401. the pre-arranged gas injection device is controlled to perform intermittent gas injection treatment in the first range along a first direction to lead to forced vibration of the to-be-picked fruit located in the first range in the first direction, wherein an angle between the first direction and an image acquisition direction of the camera is not zero;

and the step S5 of performing second-time image acquisition processing on the to-be-picked fruit many times by using a pre-arranged camera in a forced vibration process of the to-be-picked fruit to obtain a plurality of second images includes:

S501. by a pre-arranged spot generator, an appointed spot is projected on the to-be-picked fruit in the forced vibration process of the to-be-picked fruit, wherein a projection direction of the appointed spot projected by the spot generator is parallel to the image acquisition direction of the camera; and

S502. second-time image acquisition processing is performed on the to-be-picked fruit projected by the appointed spot many times by using the pre-arranged camera to obtain a plurality of second images with spots.

Therefore, the prediction accuracy of the three-dimensional parameters of the to-be-picked fruit is improved, and it is convenient to acquire and process the second images as well. Although the application does not restrain the forced vibration direction of the to-be-picked fruit, if the forced vibration direction of the to-be-picked fruit is parallel to the image acquisition direction of the camera, the difference between the second images acquired by the camera and the first image is much smaller, and the difference between the two second images is much smaller too. The first image and the second images are a basis of three-dimensional parameter prediction, thereby affecting the prediction accuracy of the three-dimensional parameters subsequently. Therefore, the application restrains the gas injection angle, which is reflected in specific steps: the pre-arranged gas injection device is controlled to perform intermittent gas injection treatment in the first range along a first direction to lead to forced vibration of the to-be-picked fruit located in the first range in the first direction, wherein an angle between the first direction and an image acquisition direction of the camera is not zero. In this way, there is an included angle between the gas injection direction and the acquisition direction of the camera, and thus, forced vibration is more obvious if viewed from the position of the camera. The angle between the first direction and the image acquisition direction of the camera can be any feasible angle. The greater the numerical value of the angle is, the more beneficial improvement of the prediction accuracy of the three-dimensional parameters subsequently is. It is necessary to adjust the position and the injection direction of the gas injection device. The smaller the numerical value of the angle is, the poorer the prediction accuracy of the three-dimensional parameters subsequently is. In spite of this, when the scheme of the application is implemented, it is nearly unnecessary to adjust the position and the injection direction of the gas injection device (for example, when the angle is zero, the position and the image acquisition direction of the camera are respectively same as the position and the injection direction of the gas injection device). Therefore, it is rapid to implement with lowered cost. Moreover, the spot generator is used to project the appointed spots, so that there is an obvious reference substance for processing the second images, and thus, the image processing speed and accuracy are improved.

Further, the step S6 of performing, by taking the first image as a reference object, screening processing on the plurality of second images according to a preset image screening method to screen out two appointed second images deviating from an equilibrium position to the maximum extent includes:

S601. feature points are extracted from the first image and acquiring positions of the feature points in the plurality of second images with the spots;

S602. vector generation processing is performed by taking the feature point as a starting point and the appointed spot as an ending point so as to obtain a plurality of deviation measuring vectors respectively corresponding to the plurality of second images with the spots; and

S603. the two appointed second images deviating from the equilibrium position to the maximum extent are screened out based on the plurality of deviation measuring vectors.

Therefore, the screening speed and accuracy of the appointed second images are improved. As the first image is a stationary image, the feature point therein is obvious and can be used as a reference point. As the second images are acquired in the forced vibration process, it is difficult to determine the extent deviating from the equilibrium position efficiently. In the application, by virtues of the appointed spots and feature points, a deviating constant vector is generated, and the two appointed second images deviating from the equilibrium position to the maximum extent are screened out whereby. It is to be noted that the deviating constant vector is not necessarily parallel to the forced vibration direction because in the forced vibration process, the distances between the feature points and the appointed spots will be scaled up, so that it is beneficial to screen the appointed second images.

As described in the above-mentioned steps S7-S9, the first image and the two second images are jointly inputted into the preset three-dimensional parameter prediction model for the fruit so as to obtain predicted three-dimensional parameters outputted by the three-dimensional parameter prediction model for the fruit, wherein the three-dimensional parameter prediction model for the fruit is trained by the preset neural network model; the second range is determined according to the predicted three-dimensional parameters and the manipulator is controlled to perform second-time moving processing to make the manipulator reduce the coverage to the second range, wherein the second range is smaller than the first range; the fruit stem position in the first image is determined and cutting processing is performed on the fruit stem position by using the pre-arranged cutting device to make the to-be-picked fruit to fall onto the manipulator, so as to complete the picking process.

The neural network model can be any feasible model, for example, convolutional neural network model and the like. Any feasible method, for example, the supervised learning mode, can be used in the training process, and in the training process, parameters of each network can be optimized by using a back propagation algorithm and a gradient descent algorithm. As the first image includes two dimension data in one plane and the two appointed second images further reflect the eigenvibration characteristic of the to-be-picked fruit. The eigenvibration characteristic is directly relevant to the third dimension data. Therefore, the two appointed second images include the third dimension data, so that the three-dimensional parameters of the to-be-picked fruit can be predicted through the first image and the two appointed second images.

Further, the training process of the three-dimensional parameter prediction model for the fruit can be any feasible process, for example, before the step S7 of jointly inputting the first image and the two second images into a preset three-dimensional parameter prediction model for the fruit so as to obtain predicted three-dimensional parameters outputted by the three-dimensional parameter prediction model for the fruit, the three-dimensional parameter prediction model for the fruit being trained by a preset neural network model, the method includes:

S61. image acquisition processing is performed on a sample fruit growing on a tree to obtain a first sample image;

S62. intermittent gas injection treatment is performed on the sample fruit by using the pre-arranged gas injection device to lead to forced vibration of the sample fruit;

S63. image acquisition processing is respectively performed when the sample fruit is located in two maximum amplitude positions to obtain two second sample images;

S64. manual measurement is performed on the sample fruit to obtain the three-dimensional parameters of the sample fruit; S65. the first sample image and the two second sample images are taken as a sample image set, and the three-dimensional parameters of the sample fruit are annotated on the sample image set;

S66. the sample image set is divided into a training image set and a verifying image set, the preset neural network model is invoked, and the training image set is inputted into the neural network model to be trained to obtain an intermediate prediction model;

S67. verification processing is performed on the intermediate prediction model by using the verifying image set, and whether a verification processing result is that the intermediate prediction model passes the verification or not is judged; and S68. the intermediate prediction model is marked as the three-dimensional parameter prediction model for the fruit if the verification processing result is that the intermediate predication model passes the verification.

A second range is then determined according to the predicted three-dimensional parameters and the manipulator is controlled to perform second-time moving processing to make the manipulator reduce a coverage to the second range, wherein the second range is smaller than the first range. As the three-dimensional parameters can be predicted more precisely, the range can be reduced. The manipulator moves at the second time to reduce the range, so that the falling time of the to-be-picked fruit is shorter, with a smaller probability of collision. Moreover, although the second time moving processing is mentioned above, the mechanical fingers pre-arranged on the manipulator will be tightened correspondingly to define a smaller range as a result of subsequent restriction: the manipulator reduces the coverage to the second range, and as more accurate three-dimensional parameters of the fruit have been determined, in the second time moving process (including the tightening process of the mechanical fingers) of the manipulator, the to-be-picked fruit will not be touched.

A fruit stem position in the first image is then determined and cutting processing is performed on the fruit stem position by using a pre-arranged cutting device to make the to-be-picked fruit to fall onto the manipulator, so as to complete a picking process. Further, the manipulator is a flexible manipulator, and a contact portion between the flexible manipulator and the fruit is made from a flexible material, so that the probability of bumping of the fruit is further reduced.

The fruit picking method based on a three-dimensional parameter prediction model for a fruit provided by the application includes: performing first-time image acquisition processing on a to-be-picked fruit to obtain a first image; determining a first range that accommodates the to-be-picked fruit; controlling a pre-arranged manipulator to perform first-time moving processing; performing intermittent gas injection treatment in the first range to lead to forced vibration of the to-be-picked fruit in the first range; performing second-time image acquisition processing many times to obtain a plurality of second images; performing screening, by taking the first image as an reference object, the plurality of second images, to screen out two appointed second images deviating from an equilibrium position to the maximum extent; jointly inputting the first image and the two appointed second images into a preset three-dimensional parameter prediction model for the fruit so as to obtain predicted three-dimensional parameters outputted by the three-dimensional parameter prediction model for the fruit; determining a second range according to the predicted three-dimensional parameter, and controlling the manipulator to perform second-time moving processing; and performing cutting treatment on a fruit stem position by using a pre-arranged cutting device to make the to-be-picked fruit fall onto the manipulator. Therefore, the picking process is completed, and the method realizes a purpose of precisely and intelligently picking the fruit without damaging the fruit and a fruit tree.

The embodiment of the application provides a fruit picking device based on a three-dimensional parameter prediction model for a fruit, including: a first image acquisition unit for performing first-time image acquisition processing on a to-be-picked fruit by using a pre-arranged camera to obtain a first image;

a first range determination unit for determining a first range that accommodates the to-be-picked fruit based on the first image according to a preset range positioning method;

a first-time moving unit for controlling a pre-arranged manipulator to perform first-time moving processing to move the manipulator to an outside of the first range and cover the first range from below, and guaranteeing that the manipulator does not enter the first range in a moving process as well;

a gas injection unit for controlling a pre-arranged gas injection device to perform intermittent gas injection treatment in the first range to lead to forced vibration of the to-be-picked fruit in the first range;

a second image acquisition unit for performing second-time image acquisition processing on the to-be-picked fruit many times by using a pre-arranged camera in a forced vibration process of the to-be-picked fruit to obtain a plurality of second images;

a second image screening unit for performing, by taking the first image as a reference object, screening processing on the plurality of second images according to a preset image screening method to screen out two appointed second images deviating from an equilibrium position to the maximum extent;

a predicted three-dimensional parameter acquisition unit for jointly inputting the first image and the two second images into a preset three-dimensional parameter prediction model for the fruit so as to obtain predicted three-dimensional parameters outputted by the three-dimensional parameter prediction model for the fruit, wherein the three-dimensional parameter prediction model for the fruit is trained by a preset neural network model;

a second-time moving unit for determining a second range according to the predicted three-dimensional parameters and controlling the manipulator to perform second-time moving processing to make the manipulator reduce a coverage to the second range, wherein the second range is smaller than the first range; and a fruit picking unit for determining a fruit stem position in the first image and performing cutting processing on the fruit stem position by using a pre-arranged cutting device to make the to-be-picked fruit to fall onto the manipulator, so as to complete a picking process.

Operations for execution by the units correspond to the steps of the fruit picking method based on the three-dimensional parameter prediction model for the fruit of the above-mentioned embodiment one by one, which is not described repeatedly herein.

The fruit picking device based on a three-dimensional parameter prediction model for a fruit provided by the application performs first-time image acquisition processing on a to-be-picked fruit to obtain a first image; determines a first range that accommodates the to-be-picked fruit; controls a pre-arranged manipulator to perform first-time moving processing; performs intermittent gas injection treatment in the first range to lead to forced vibration of the to-be-picked fruit in the first range; performs second-time image acquisition processing many times to obtain a plurality of second images; performs screening, by taking the first image as an reference object, the plurality of second images, to screen out two appointed second images deviating from an equilibrium position to the maximum extent; jointly inputs the first image and the two appointed second images into a preset three-dimensional parameter prediction model for the fruit so as to obtain predicted three-dimensional parameters outputted by the three-dimensional parameter prediction model for the fruit; determines a second range according to the predicted three-dimensional parameter, and controlling the manipulator to perform second-time moving processing; and performs cutting treatment on a fruit stem position by using a pre-arranged cutting device to make the to-be-picked fruit fall onto the manipulator. Therefore, the picking process is completed, and the method realizes a purpose of precisely and intelligently picking the fruit without damaging the fruit and a fruit tree.

Figure 2:
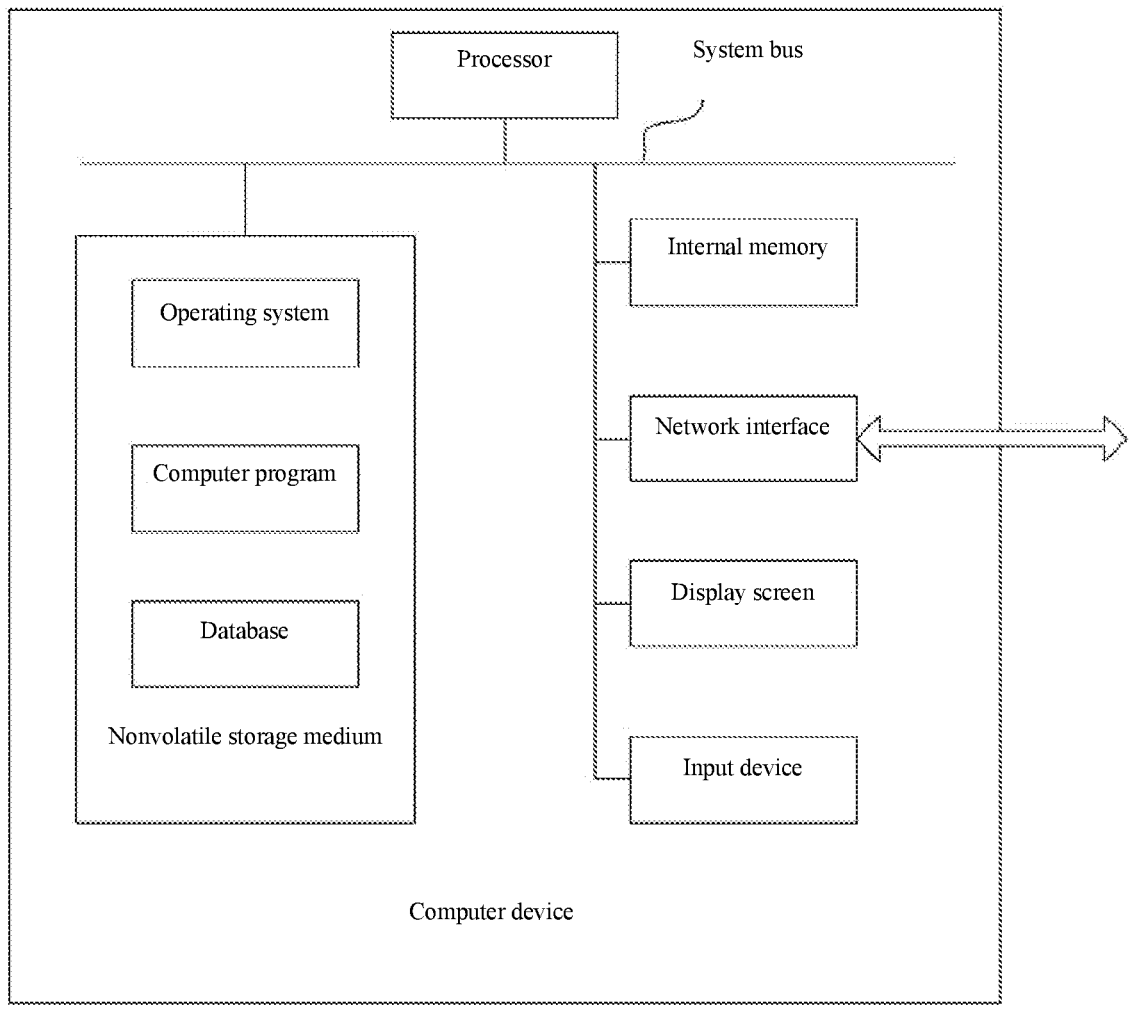
FIG. 2 is a structural schematic block diagram of the computer device of an embodiment of the application.

Referring to FIG. 2, the embodiment of the present invention further provides a computer device, wherein the computer device can be a server, the internal structure of which may be shown in a figure. The computer device includes a processor, a memory, a network interface and a database connected via a system bus. The processor designed by the computer is used for providing calculation and control abilities. The memory of the computer device includes a nonvolatile storage medium and an internal memory. The nonvolatile storage medium stores an operating system, a computer program and a database. The internal memory provides an environment for operation of the operating system and the computer program in the nonvolatile storage medium. A database of the computer device is used for storing data used for the fruit picking method based on a fruit three-dimensional prediction model. The network interface of the computer device is used for connected communication with an external terminal via a network. The computer program is executed by a processor to implement a fruit picking method based on a fruit three-dimensional prediction model.

The processor executes the fruit picking method based on a fruit three-dimensional prediction model, wherein the steps included in the method respectively correspond to the steps of the fruit picking method based on a fruit three-dimensional prediction model executing the above-mentioned embodiment one by one, which is not described repeatedly herein.

Those skilled in the art can understand that the structure illustrated in the figure is merely a block diagram of a partial structure related to the scheme of the application and does not constitute limitation to the computer device in the scheme of the application applied thereto.

The computer device provided by the application performs first-time image acquisition processing on a to-be-picked fruit to obtain a first image; determines a first range that accommodates the to-be-picked fruit; controls a pre-arranged manipulator to perform first-time moving processing; performs intermittent gas injection treatment in the first range to lead to forced vibration of the to-be-picked fruit in the first range; performs second-time image acquisition processing many times to obtain a plurality of second images; performs screening, by taking the first image as an reference object, the plurality of second images, to screen out two appointed second images deviating from an equilibrium position to the maximum extent; jointly inputs the first image and the two appointed second images into a preset three-dimensional parameter prediction model for the fruit so as to obtain predicted three-dimensional parameters outputted by the three-dimensional parameter prediction model for the fruit; determines a second range according to the predicted three-dimensional parameter, and controlling the manipulator to perform second-time moving processing; and performs cutting treatment on a fruit stem position by using a pre-arranged cutting device to make the to-be-picked fruit fall onto the manipulator. Therefore, the picking process is completed, and the method realizes a purpose of precisely and intelligently picking the fruit without damaging the fruit and a fruit tree.

An embodiment of the application further provides a computer readable storage medium with a computer program stored thereon. The computer program is executed by the processor to realize the fruit picking method based on a fruit three-dimensional prediction model, wherein the steps included in the method respectively correspond to the steps of the fruit picking method based on a fruit three-dimensional prediction model executing the above-mentioned embodiment one by one, which is not described repeatedly herein.

The computer readable storage medium provided by the application performs first-time image acquisition processing on a to-be-picked fruit to obtain a first image; determines a first range that accommodates the to-be-picked fruit; controls a pre-arranged manipulator to perform first-time moving processing; performs intermittent gas injection treatment in the first range to lead to forced vibration of the to-be-picked fruit in the first range; performs second-time image acquisition processing many times to obtain a plurality of second images; performs screening, by taking the first image as an reference object, the plurality of second images, to screen out two appointed second images deviating from an equilibrium position to the maximum extent; jointly inputs the first image and the two appointed second images into a preset three-dimensional parameter prediction model for the fruit so as to obtain predicted three-dimensional parameters outputted by the three-dimensional parameter prediction model for the fruit; determines a second range according to the predicted three-dimensional parameter, and controlling the manipulator to perform second-time moving processing; and performs cutting treatment on a fruit stem position by using a pre-arranged cutting device to make the to-be-picked fruit fall onto the manipulator. Therefore, the picking process is completed, and the method realizes a purpose of precisely and intelligently picking the fruit without damaging the fruit and a fruit tree.

Those skilled in the art can understand that implementation of all or part of flows in the method of the embodiment is completed by means of hardware related to the computer program or instruction. The computer program can be stored in a nonvolatile computer readable storage medium. When the computer program is executed, it can include the flows of the embodiments of the methods. Any citation of the memory, storage, database or other media provided by the application and used in the embodiments can include a nonvolatile and/or volatile memory. The nonvolatile memory can include read-only memory (ROM), programmable ROM (PROM), electrical programmable ROM (EPROM), an erasable programmable ROM (EEPROM) or a flash memory. The volatile memory can include a random access memory (Ram) or an external high speed cache memory. As description rather than limitation, the RAM can be obtained in various forms, for example, a static RAM (SRAM), a dynamic RAM (DRAM), a synchronous DRAM (SDRAM), a double data rate SDRM (SSRSDRAM), an enhanced SDRAM (ESDRAM), a synchronization link (Synchlink) DRAM (SLDRAM), a memory bus (Rambus), a direct RAM (RDRAM), a direct memory bus dynamic RAM (DRDRAM), a memory bus dynamic RAM (RDRAM) and the like.

It should be noted that the terms "comprises", "include" or any other variants herein are intended to cover nonexcludable inclusion, such that the process, apparatus, article or method including a series of elements only includes the elements, but also includes other elements which are not limited clearly, or further includes all inherent elements of the process, apparatus, article or method. Under a circumstance of no more limitations, for the elements defined by the term "include one", a condition that there are additional same elements in the process, apparatus, article or method including the elements is not excluded.

The above is merely preferred embodiments of the application and does not hence limit the patent range of the application. Equivalent structure or equivalent flow conversion made by means of the contents of the description and drawings of the application are applied to other related technical fields directly or indirectly, which is, in a similar way, comprised in the protection scope of the patent of the application.

What is claimed is:

1. A fruit picking method based on a three-dimensional parameter prediction model for a fruit, comprising:
    performing first-time image acquisition processing to obtain a first image of a to-be-picked fruit by a camera;
    determining a first range that accommodates the to-be-picked fruit based on the first image;
    controlling a manipulator to perform first-time moving processing to move the manipulator to an outside of the first range and cover the first range from below, and guaranteeing that the manipulator does not enter the first range while moving;
    controlling a gas injection device to inject gas intermittently in the first range to lead to forced vibration of the to-be-picked fruit in the first range, wherein the controlling the gas injection device to inject gas intermittently in the first range to lead to forced vibration of the to-be-picked fruit in the first range comprises:
        controlling the gas injection device to inject the gas intermittently in the first range along a first direction to lead to forced vibration of the to-be-picked fruit located in the first range in the first direction, wherein an angle between the first direction and an image acquisition direction of the camera is not zero;
    performing second-time image acquisition processing on the to-be-picked fruit repeatedly by using the camera in a forced vibration process of the to-be-picked fruit to obtain a plurality of second images, wherein the performing second-time image acquisition processing on the to-be-picked fruit comprises:
        projecting, by a spot generator, an appointed spot on the to-be-picked fruit in the forced vibration process of the to-be-picked fruit, wherein a projection direction of the appointed spot projected by the spot generator is parallel to the image acquisition direction of the camera; and
        performing second-time image acquisition processing on the to-be-picked fruit projected by the appointed spot by using the camera to obtain a plurality of second images with spots;
    performing, by taking the first image as a reference object, screening processing on the plurality of second images to screen out two appointed second images deviating from an equilibrium position to a maximum extent;
    jointly inputting the first image and the two second images into a preset three-dimensional parameter prediction model for the fruit so as to obtain predicted three-dimensional parameters outputted by the three-dimensional parameter prediction model for the fruit, wherein the three-dimensional parameter prediction model for the fruit is trained by a preset neural network model;
    determining a second range according to the predicted three-dimensional parameters and controlling the manipulator to perform second-time moving processing to make the manipulator reduce a coverage to the second range, wherein the second range is smaller than the first range; and
    determining a fruit stem position in the first image and performing cutting processing on the fruit stem position by using a cutting device to make the to-be-picked fruit to fall onto the manipulator, so as to complete a picking process.

2. The fruit picking method based on a three-dimensional parameter prediction model for a fruit according to claim 1, wherein the determining a first range that accommodates the to-be-picked fruit based on the first image comprises:
    acquiring a maximum accommodation range of the manipulator that unfolds mechanical fingers to a maximum extent;
    determining a center position of the to-be-picked fruit in the first image and drawing the maximum accommodation range based on the center position to obtain a temporary range;
    judging whether the temporary range accommodates the to-be-picked fruit fully or not; and
    marking the temporary range as the first range if the temporary range accommodates the to-be-picked fruit fully.

3. The fruit picking method based on a three-dimensional parameter prediction model for a fruit according to claim 1, wherein the performing, by taking the first image as a reference object, screening processing on the plurality of second images to screen out two appointed second images deviating from an equilibrium position to the maximum extent comprises:
    extracting feature points from the first image and acquiring positions of the feature points in the plurality of second images with the spots;
    performing vector generation processing by taking the feature point as a starting point and the appointed spot as an ending point so as to obtain a plurality of deviation measuring vectors respectively corresponding to the plurality of second images with the spots; and
    screening out the two appointed second images deviating from the equilibrium position to the maximum extent based on the plurality of deviation measuring vectors.

4. The fruit picking method based on a three-dimensional parameter prediction model for a fruit according to claim 1, wherein before the jointly inputting the first image and the two second images into a preset three-dimensional parameter prediction model for the fruit so as to obtain predicted three-dimensional parameters outputted by the three-dimensional parameter prediction model for the fruit, the three-dimensional parameter prediction model for the fruit being trained by a preset neural network model, the method comprising:

performing image acquisition processing on a sample fruit growing on a tree to obtain a first sample image;

performing intermittent gas injection treatment on the sample fruit by using the gas injection device to lead to forced vibration of the sample fruit;

respectively performing image acquisition processing when the sample fruit is located in two maximum amplitude positions to obtain two second sample images;

performing manual measurement on the sample fruit to obtain the three-dimensional parameters of the sample fruit;

taking the first sample image and the two second sample images as a sample image set, and annotating the three-dimensional parameters of the sample fruit on the sample image set;

dividing the sample image set into a training image set and a verifying image set, invoking the preset neural network model, and inputting the training image set into the neural network model to be trained to obtain an intermediate prediction model;

performing verification processing on the intermediate prediction model by using the verifying image set, and judging whether a verification processing result is that the intermediate prediction model passes the verification or not; and marking the intermediate prediction model as the three-dimensional parameter prediction model for the fruit if the verification processing result is that the intermediate predication model passes the verification.

5. A fruit picking device based on a three-dimensional parameter prediction model for a fruit, comprising:

a first image acquisition unit for performing first-time image acquisition processing to obtain a first image of a to-be-picked fruit using a camera;

a first range determination unit for determining a first range that accommodates the to-be-picked fruit based on the first image;

a first-time moving unit for controlling a manipulator to move the manipulator to an outside of the first range and cover the first range from below, and guaranteeing that the manipulator does not enter the first range while moving;

a gas injection unit for controlling a gas injection device to perform intermittent gas injection treatment in the first range to lead to forced vibration of the to-be-picked fruit in the first range, wherein the gas injection unit is further configured to control the gas injection device to perform intermittent gas injection treatment in the first range along a first direction to lead to forced vibration of the to-be-picked fruit located in the first range in the first direction, wherein an angle between the first direction and an image acquisition direction of the camera is not zero;

a second image acquisition unit for performing second-time image acquisition processing on the to-be-picked fruit many times by using the camera in a forced vibration process of the to-be-picked fruit to obtain a plurality of second images, wherein the second image acquisition unit is further configured to:

project, by a spot generator, an appointed spot on the to-be-picked fruit in the forced vibration process of the to-be-picked fruit, wherein a projection direction of the appointed spot projected by the spot generator is parallel to the image acquisition direction of the camera; and perform second-time image acquisition processing on the to-be-picked fruit projected by the appointed spot many times by using the camera to obtain a plurality of second images with spots;

a second image screening unit for performing, by taking the first image as a reference object, screening processing on the plurality of second images to screen out two appointed second images deviating from an equilibrium position to a maximum extent;

a predicted three-dimensional parameter acquisition unit configured to jointly input the first image and the two second images into a preset three-dimensional parameter prediction model for the fruit so as to obtain predicted three-dimensional parameters outputted by the three-dimensional parameter prediction model for the fruit, wherein the three-dimensional parameter prediction model for the fruit is trained by a preset neural network model;

a second-time moving unit for determining a second range according to the predicted three-dimensional parameters and controlling the manipulator to perform second-time moving processing to make the manipulator reduce a coverage to the second range, wherein the second range is smaller than the first range; and a fruit picking unit for determining a fruit stem position in the first image and performing cutting processing on the fruit stem position by using a cutting device to make the to-be-picked fruit to fall onto the manipulator, so as to complete a picking process.

* * * * *